(12) United States Patent
Beebe (10) Patent No.: US 11,882,820 B2
(45) Date of Patent: Jan. 30, 2024

(54) SIDE SHELF FISHING SEAT (71) Applicant: Eugene Beebe, Ketchikan, AK (US)

(72) Inventor: Eugene Beebe, Ketchikan, AK (US)

( * ) Notice: Subject to any disclaimer, the term of this patent is extended or adjusted under 35 U.S.C. 154(b) by 276 days.

(21) Appl. No.: 17/503,446

(22) Filed: Oct. 18, 2021

(65) Prior Publication Data
US 2022/0125028 A1    Apr. 28, 2022

Related U.S. Application Data (60) Provisional application No. 63/104,857, filed on Oct. 23, 2020.

(51) Int. Cl.
B63B 29/04    (2006.01)
A01K 97/22    (2006.01)

(52) U.S. Cl.
CPC .............. A01K 97/22 (2013.01); B63B 29/04 (2013.01); B63B 2029/043 (2013.01)

(58) Field of Classification Search
CPC .... A01K 97/22; B63B 29/04; B63B 2029/043
See application file for complete search history.

(56) References Cited

U.S. PATENT DOCUMENTS

| | | | | |
|---|---|---|---|---|
| 2,902,085 A * | 9/1959 | Bahnson, Sr. | ......... | B60N 2/757 297/115 |
| 5,390,999 A * | 2/1995 | Fuller | .................. | A47B 83/008 312/258 |
| 5,873,192 A * | 2/1999 | Chiu | ...................... | A45B 11/00 43/21.2 |
| 6,119,812 A * | 9/2000 | Chin | ...................... | A01K 97/22 382/152 |
| 7,163,262 B2 * | 1/2007 | Anglin | ...................... | A47C 4/04 62/331 |
| 8,157,239 B2 * | 4/2012 | Owen | ...................... | B60N 3/10 248/512 |
| 8,763,537 B2 * | 7/2014 | Ng | ......................... | A47B 3/083 297/331 |
| 11,278,034 B2 * | 3/2022 | Gonzalez | ............. | A47B 3/0818 |
| 2007/0178820 A1 * | 8/2007 | Tylman | .................. | A22C 25/06 452/194 |
| 2018/0160669 A1 * | 6/2018 | Pipe | ......................... | B63B 29/04 |
| 2021/0076653 A1 * | 3/2021 | Leigh | ........................ | A47B 9/16 |
| 2022/0125028 A1 * | 4/2022 | Beebe | ...................... | B63B 34/05 |

* cited by examiner

Primary Examiner — Philip F Gabler
(74) Attorney, Agent, or Firm — Brennan, Manna, & Diamond, LLC (57) ABSTRACT The present invention relates to an improved fishing seat designed to be used on a boat. The fishing seat is configured to be attached to an interior of a boat, and in one potential embodiment to a shelf/inwale of the boat. The fishing seat features a substantially rectangular backplate that is attached to the shelf and is designed to laterally move along the shelf, thereby enabling the fishing seat to lock into a desired position at any forward, amidships or aft position. A seating platform extending orthogonally from the backplate (and accessible from three sides), is used for sitting by a user for an activity such as fishing. The fishing seat can be generally folded flat when not in use to save space. A supporting plate hingedly connects a base of the backplate and a bottom surface of the seating platform.

20 Claims, 6 Drawing Sheets

SIDE SHELF FISHING SEAT

CROSS-REFERENCE TO RELATED APPLICATION

The present application claims priority to, and the benefit of, U.S. Provisional Application No. 63/104,857, which was filed on Oct. 23, 2020 and is incorporated herein by reference in its entirety.

FIELD OF THE INVENTION

The present invention relates generally to the field of fishing chairs. More specifically, the present invention relates to a side shelf fishing seat designed to be installed under a gunwale and along a shelf/inwale of a fishing boat. The fishing seat is designed to move along the side shelf of the fishing boat, thereby enabling it to be positioned at any location from forward, amidships and aft based on the space available on the boat. The fishing seat includes a backplate that is locked into an inner edge of the gunwale and a bottom edge of the shelf. A seating platform can be hingedly-coupled to the backplate wherein the seating platform is perpendicularly oriented to the backplate for use by a user for sitting. The seating platform is supported by a supporting plate extending from a base of the backplate at a generally forty-five degree angle to the seating platform. The fishing seat is foldable and movable, making it a safe and easy solution for sitting while engaged in an activity such as fishing on a boat. Accordingly, the present disclosure makes specific reference thereto. Nonetheless, it is to be appreciated that aspects of the present invention are also equally applicable to other like applications, devices and methods of manufacture.

BACKGROUND

Water activities such as fishing are enjoyed by various individuals around the world. Fishing is the sport of catching fish by using a rod, reel, line and hook in freshwater or saltwater. Generally, individuals travel over water bodies by means of boats, ships and other similar transportation means. While traveling with a boat over a body of water to fish, individuals may seek out seats or chairs on which they can sit comfortably while catching fish. In standard boats and ships, individuals can find it difficult to locate any seats on which individuals can sit while fishing. Without a proper seat, individuals may sit on gunwales while fishing. However, individuals may be uncomfortable while sitting on gunwales, and may risk their lives in the event they fall overboard in rough waters. Also, individuals have to be on 'alert' while sitting on gunwales, and may not be able to fully enjoy the fishing experience.

Further, while fishing, some individuals also sit on ice chests kept on the floor space of boats or ships. However, the ice chests are not fixed to the floor of the boats and can easily slide around in waves. Also, the ice chests placed on the floor are not at a comfortable height and it may be inconvenient for individuals to perform casting and fishing while seated on ice chests.

Other seating options, such as deck chairs, are also available for individuals traveling on boats/ships. However, deck chairs take up valuable floor space when used, and take up too much space when stored. Therefore, individuals may not carry deck chairs with them. Other types of seats are also available for use while being on boats and ships. Although seats, heretofore known, may be good for sitting while traveling on boats/ships, those seats tend to be impractical when fishing, and may spoil the fishing experience. Individuals desire improved seating options while fishing.

Therefore, there exists a long felt need in the art for a seating device that can be comfortably used by individuals fishing while traveling on boats and ships. There is also a long felt need in the art for a seating chair that can be easily attached to any standard boat or ship, and does not require a specific installation setup. Additionally, there is a long felt need in the art for a chair that prohibits the need to sit on gunwales while fishing, thereby preventing the individuals from falling overboard in rough waters. Moreover, there is a long felt need in the art for a chair that enables the individuals to fully enjoy the fishing experience while comfortably sitting on a chair on the boat/ship. Further, there is a long felt need in the art for a chair that prohibits the need to sit on other uncomfortable seating options such as ice chests, deck chairs and other types of seats. Furthermore, there is a long felt need in the art for a seating option that is at a comfortable height and safe location. Finally, there is a long felt need in the art for a chair/seat that keeps the floor space of the boat/ship open for fishing, while ensuring there are enough seats on board.

The subject matter disclosed and claimed herein, in one potential embodiment thereof, comprises a movable and foldable fishing seat. The fishing seat can move along the shelf of a boat, and can be folded when not in use for sitting on a boat. The fishing seat includes a substantially rectangular backplate, having a top edge and a base support edge, the top edge can be locked into an inner edge of a gunwale and the base support edge can be locked into a bottom edge of the shelf, thereby enabling the backplate to laterally move along the shelf/inwale. A seating platform can be hingedly-attached to a front surface of the backplate, and a support plate can extend generally at forty-five degrees from the base support edge to meet a bottom surface of the seating platform when the seating platform is extended in a perpendicular direction relative to the baseplate. Both the seating platform and the supporting plate can be folded or collapsed to fold the fishing seat when it is not used for sitting.

In this manner, the novel fishing seat of the present invention, when deployed for users on a fishing boat, accomplishes all of the forgoing objectives, and provides a relatively safe, easy and convenient seat that prohibits the risk of falling overboard in rough waters. The seat can be fixed to and moved along a side shelf of a boat, thereby enabling boaters to move the seat to any location forward and aft on the boat, including port, starboard or both. The seat can be folded and removed when not in use to enable boaters to save space.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one potential embodiment thereof, comprises a movable fishing seat. The movable fishing seat is designed to be moved along a shelf of a boat for seating and to be folded when not in use. The fishing seat further comprises: a substantially rectangular backplate having a top edge and a base support edge; the top edge can be locked into an inner edge of gunwale; the base support edge can be locked into a bottom edge of the shelf, thereby enabling the backplate to laterally move along the shelf/inwale; a seating platform can be hingedly-attached to a front surface of the backplate; and, a support plate extending at forty-five degrees from the base support edge to meet a bottom surface of the seating platform when the seating platform is extended in a perpendicular direction relative to the baseplate, wherein the seating platform is used by a user for sitting. Both the seating platform and the support plate can be folded to fold the fishing seat when not in use.

In yet another embodiment of the present invention, the seating platform can be configured to rotate along the hinged connection towards the base support edge of the backplate, thus providing an overlap between the seating platform and the backplate.

In yet another embodiment of the present invention, an improved fishing seat is disclosed. The improved fishing seat includes: a backplate that can be attached to an interior of a fishing boat; a seating platform attached to the backplate using a plurality of hinges; and a supporting plate for supporting the seating platform when a user sits on the seating platform. The supporting plate can extend from a base edge of the backplate to a bottom surface of the seating platform when the seating platform is in an extended or deployed position. The seating platform can include a non-slip protective surface that provides a comfortable seat height and safe location for the user to sit in the boat for an activity such as fishing.

In yet another embodiment, a method of mounting a fishing seat to a side shelf or inwale of a boat is described. The method includes fixing a backplate of the fishing seat into the side shelf of the boat, such that the backplate is movable along the side shelf in forward and aft locations, extending a seating platform generally perpendicular in a direction relative to the backplate along a hinged edge of the seating platform attached to the backplate, and extending a supporting plate from a base arm of the backplate to a bottom surface of the extended seating platform for supporting the extended seating platform.

In yet another embodiment of the present invention, a method for folding a mounted fishing seat on a fishing boat is described. The method includes folding a seating platform of the fishing seat, then folding a supporting arm of the fishing seat and removing the backplate of the fishing seat from a side shelf/inwale in which the fishing seat is mounted.

To the accomplishment of the foregoing and related ends, certain illustrative aspects of the disclosed innovation are described herein in connection with the following description and the annexed drawings. These aspects are indicative, however, of but a few of the various methods in which the principles disclosed herein can be employed, and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a seating device that can be comfortably used by individuals who are fishing while traveling on boats and ships. There is also a long felt need in the art for a seating chair that can be easily attached to any standard boat or ship, and does not require a specific installation setup. Additionally, there is a long felt need in the art for a chair that prohibits the need to sit on gunwales while fishing, thereby preventing the individuals from falling overboard in rough waters. Moreover, there is a long felt need in the art for a chair that enables the individuals to fully enjoy the fishing experience, while comfortably sitting on a chair on the boat/ship. Further, there is a long felt need in the art for a chair that prohibits the need to sit on other uncomfortable seating options such as ice chests, deck chairs and other types of seats. Furthermore, there is a long felt need in the art for a seating option that is at a comfortable height and safe location. Finally, there is a long felt need in the art for a chair/seat that keeps the floor space of the boat/ship open for fishing, while ensuring there are enough seats on board.

Figure 1:
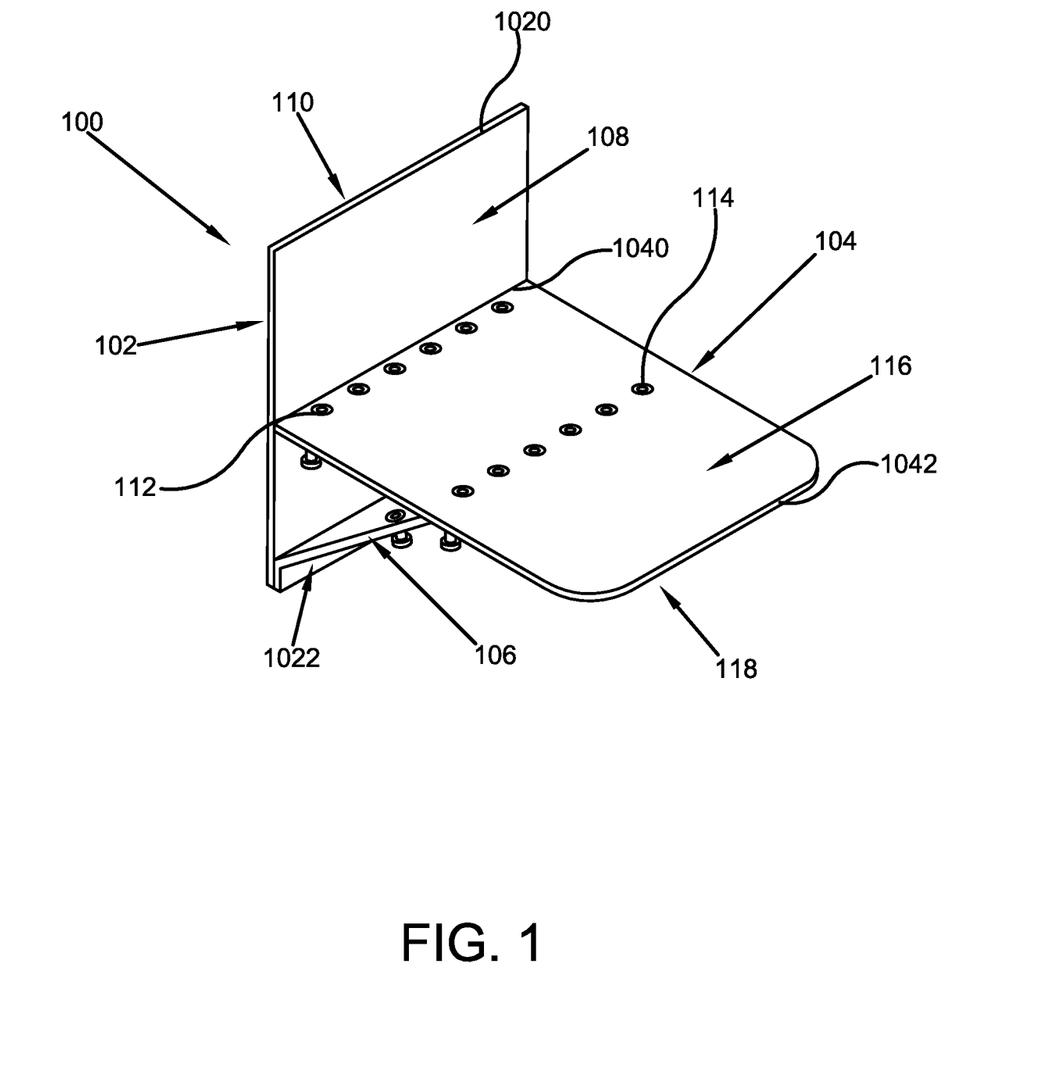
FIG. 1 illustrates a perspective view of one potential embodiment of a side shelf or gunwale fishing seat of the present invention in accordance with the disclosed architecture.

The present invention, in one exemplary embodiment, includes a novel fishing seat. The fishing seat includes a backplate that can be attached to an interior of a fishing boat and includes a front surface and a rear surface, a seating platform attached to the front surface of the backplate using a plurality of hinges, and further includes a supporting plate for supporting the seating platform when a user sits on the seating platform. The supporting plate extends from a base edge of the backplate to a bottom surface of the seating platform when the seating platform is in an extended or deployed position. The seating platform can have a non-slip protective surface that provides a comfortable height and safe location for the user to sit in the boat for an activity such as fishing Referring initially to the drawings, FIG. 1 illustrates a perspective view of one potential embodiment of the side shelf fishing seat of the present invention in accordance with the disclosed architecture. The side shelf fishing seat 100 of the present embodiment is an improved fishing seat that is flat-folding and removable. The fishing seat 100 is designed to be detachably-installed in the interior of a boat, preferably a fishing boat, and can be moved to any location such as forward, amidships and aft. More specifically, the side shelf fishing seat 100 can include a backplate 102, a seat plate or seat platform 104 and a support plate 106. The backplate 102 includes a front surface 108 and a rear surface 110, wherein the rear surface 110 aligns with the inwale (shelf) of the boat when the seat 100 is installed. The backplate 102 is generally rectangular and can have flat or rounded corners, and can be made up of a lightweight yet sturdy material such as a metal. The seat platform 104 is designed to be foldable and hingedly-connected to the front surface 108 of the backplate 102 along the hinged edge 1040 using a first set of hinges 112. The seat platform 104 can also be foldable along the second set of hinges 114, thereby enabling the seat platform 104 to be foldable to become compact when not in use. The second set of hinges 114 can also provide additional support to the seat platform 104 when in use by a user while sitting on the seat platform 104. The seating platform 104 can extend from the hinged edge 1040 to the trailing edge 1042. A user sits on the top surface 116 while engaged in a fishing activity or any other activity. The top surface 116 includes a non-slip and protective surface, and can have scratch-resistant and UV-resistant properties.

For providing additional support to the seating platform 104 when it is extended from the backplate 102, a support plate 106 extends at generally forty-five degrees from the bottom surface 118 of the seating platform 104, in one potential embodiment, at the second set of hinges 114 to a base support lock arm 1022 of the backplate 102. The support plate 106 is hingedly-attached along the second set of hinges 114 at the bottom surface 118 of the seating platform 104. Alternatively, the support plate 106 can be hingedly-fixed at the base support lock arm 1022 and can be detached from the bottom surface 118 of the seating platform 104.

The base support lock arm 1022 also acts as a rubber contact surface and contacts the interior of the fishing boat during installation of the side shelf fishing seat 100. When the fishing seat 100 is folded, the support plate 106 is collapsed to contact the bottom surface 118 of the seating platform 104, and the seating platform 104 is folded along the hinged edge 1040 to adhere to the front surface 108 of the backplate 102.

In one potential embodiment, the height (distance between top edge 1020 and the base support lock arm 1022) of the backplate 102 can be generally from about 10 inches to about 18 inches, and the width of the backplate 102 can be generally from about 9 inches to about 18 inches. Further, the seating platform 104 can be hinged at a height from about 4 inches to about 10 inches from the support lock arm 1022. The backplate 102 includes a thickness generally from about ⅛ inch to about ⅜ inches.

In one potential embodiment, the length (measured from the hinged edge 1040 to the trailing edge 1042) of the seating platform 104 is from about 12 inches to about 20 inches, and the width is from about 10 inches to about 16 inches. The second set of hinges 114 is positioned at a distance from about 4 inches to 9 inches from the hinged edge 1040. Preferably, the seating platform 104 includes a thickness from about ⅛ inches to about ⅜ inches.

In one potential embodiment, the support plate 106 includes a total length of about 12 inches, wherein approximately 1 inch comprises a hinge support and the thickness of the support plate 106 can be from about ½ inch to about 1 inch.

It should be appreciated that when a user sits on top surface 116 of the seating platform 104, the support arm 106 provides adequate support to the seating platform 104 and accordingly, the side shelf fishing seat 100 can support up to 300 lbs. with stability and without any toppling. Further, based on the available space on deck of the boat, the backplate 102 can be moved along the inwale, and the user can sit for fishing by passing the bait over the gunwale.

Figure 2:
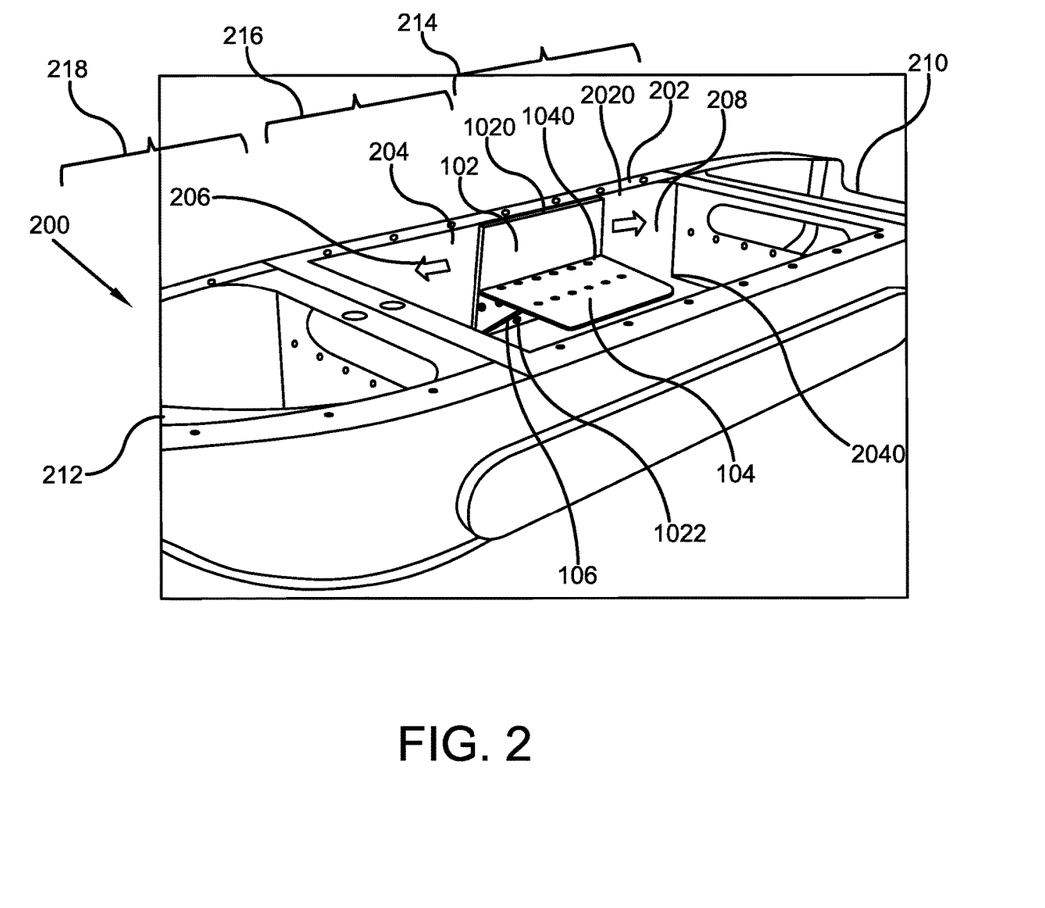
FIG. 2 illustrates a perspective view of a fishing boat with the fishing seat of the present invention in an open position and locked into gunwale and shelf (inwale) in accordance with the disclosed architecture.

FIG. 2 illustrates a perspective view of a fishing boat with the fishing seat of the present invention in an open position and locked into a gunwale and shelf (inwale) in accordance with the disclosed architecture. The improved fishing seat 100 of the present invention is designed to be installed in any conventional fishing boat for providing a seat at a comfortable height below the gunwale. As shown, an exemplary fishing boat 200 includes a gunwale 202 which is the top of the hull or the upper edge along the length of the boat 200. It should be appreciated that the gunwale 202 can extend from the stern 210 to the bow 212 of the boat 200 along the aft 214, amidships 216 and forward 218. The fishing seat 100 is installed by locking the top edge 1020 of the backplate 102 into the inner edge 2020 of the gunwale 202. The inwale or shelf 204 of the boat 200 accommodates the backplate 102 with the base support lock arm 1022 locked with the bottom edge 2040 of the inwale 204. It is to be appreciated that the user can sit in a variety of orientations relative to the boat. The top surface 116 of the seat platform 104 is accessible from three sides in the deployed orientation, to enable the user to sit and face in a multitude of directions, including facing towards the stern 210, facing towards the bow 212 and facing towards the amidships 216.

For use, the seating platform 104 extends perpendicularly from the front surface 108 of the backplate 102 and is supported by the support plate 106 extending from the base support lock arm 1022 at an angle generally about forty-five degrees to the bottom surface 118 of the seating platform 104. The seating platform 104 extends perpendicularly along the hinged edge 1040 and can be collapsed along the same edge when the seat 100 is not needed.

Advantageously, the top edge 1020 and the base edge 1022 of the backplate 102 are configured to move along the inner edge 2020 of the gunwale 202 and the bottom edge 2040 of the inwale 204 respectively, thereby enabling the fishing seat 100 to move laterally along the inwale 204 in a direction towards the bow 212 as shown by a first direction 206, and towards the stern 210 as shown by a second direction 208. This lateral motion of the foldable fishing seat 100 enables a user to position the seat 100 in accordance with the available space on the boat deck and a convenient height below the gunwale 202, thereby prohibiting the risk of falling overboard in rough waters.

The fishing seat 100 can be folded by folding the seating platform 104 flat and folding the support plate 106. The fishing seat 100 can be attached to an interior of the boat 200 and provides a place to sit or lean while fishing from the boat 200.

Figure 3:
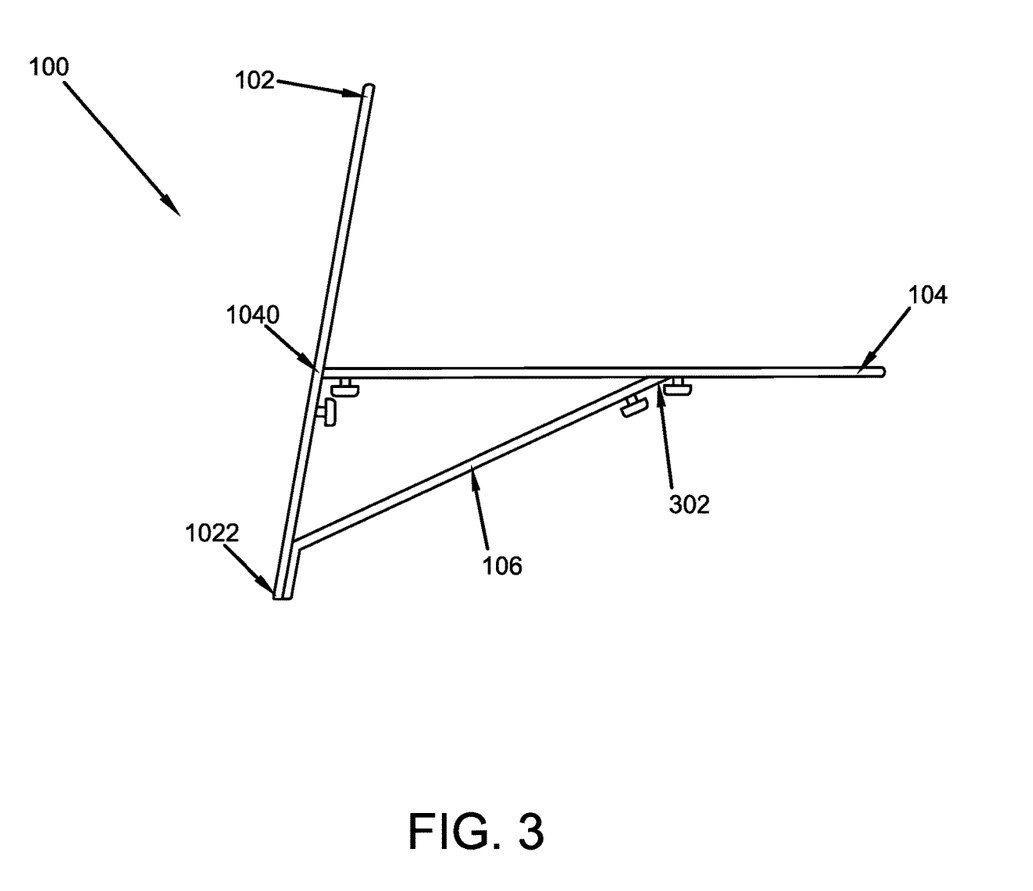
FIG. 3 illustrates a side perspective view of the improved fishing seat of the present invention in accordance with the disclosed architecture.

FIG. 3 illustrates a side perspective view of the improved fishing seat of the present invention in accordance with the disclosed architecture. As shown in FIG. 3, the backplate 102 conforms to the shape of the side of a fishing boat and includes a potential length from about 10 inches to about 18 inches, thereby enabling the backplate 102 to detachably lock into the gunwale and inwale or the shelf of the boat. At a height from about 4 inches to about 10 inches from the base of the backplate 102, the seating platform 104 can be hingedly-attached. The seating platform 104 can be from about 12 inches to about 20 inches in length to support a seated user. At the bottom surface of the seating platform 104 and at a length from about 7 inches to about 12 inches from the trailing edge of the seating platform 104, a support plate 106 is positioned, having a length about 11 inches and a hinge height of about 1 inch. The seating platform 104 can be folded along the edge 1040 to collapse the fishing seat, and the supporting plate 106 can be folded along the hinged base 1022 or along the hinged connection 302, to collapse the foldable fishing seat 100 into a flat and planar structure.

Figure 4A:
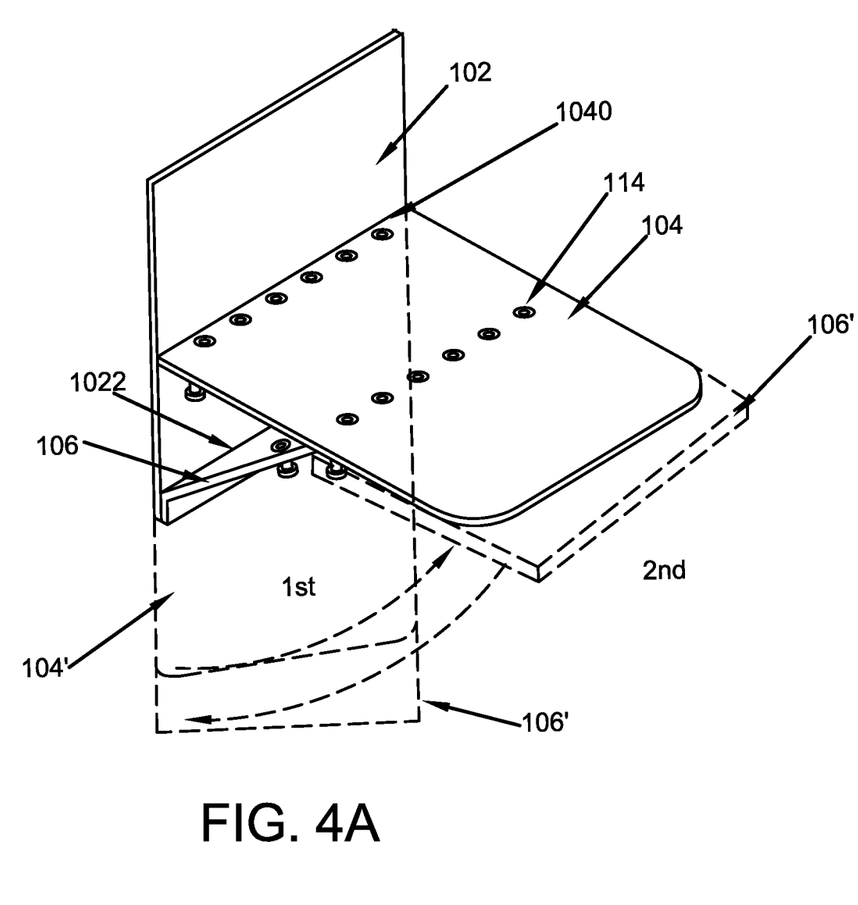
FIG. 4A illustrates a perspective view showing an exemplary method of folding the fishing seat of the present invention in accordance with the disclosed architecture.

FIG. 4A illustrates a perspective view showing an exemplary method of folding the foldable fishing seat of the present invention in accordance with the disclosed architecture. Initially, for folding the fishing seat, the supporting plate 106 is released from the base arm 1022 of the baseplate 102, thereby enabling the supporting plate 106 to be in an interim folded position 106' by rotating the supporting plate 106 as shown by the arrow "$1^{st}$", in the direction away from the base arm 1022. The rotation enables the supporting plate 106 to adhere to the bottom surface of the seating platform 104 along the second set of hinges 114. Thereafter, as shown, the seating platform 104 is rotated through the direction "$2^{nd}$", towards the base 1022 of the baseplate 102, along the edge 1040, to hinge into folded position 104' that adheres the seating platform 104 to the baseplate 102 along with the adhered supporting plate 106 that finally rotates to position 106'.

Figure 4B:
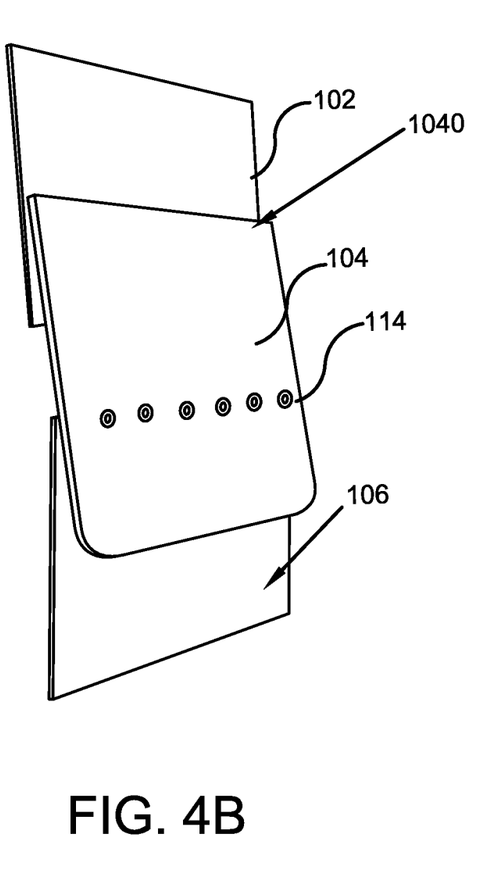
FIG. 4B illustrates a perspective view showing the fishing seat of the present invention in a folded or collapsed state as a result of the folding process shown in FIG. 4A in accordance with the disclosed architecture.

FIG. 4B illustrates a perspective view showing the fishing seat of the present invention in a folded or collapsed state as a result of the folding process shown in FIG. 4A in accordance with the disclosed architecture. As shown, in a collapsed state the seating platform 104 partially overlaps the baseplate 102, and is attached along the edge 1040 and also overlaps the support plate 106 while attached along the hinged edge 114.

Figure 5:
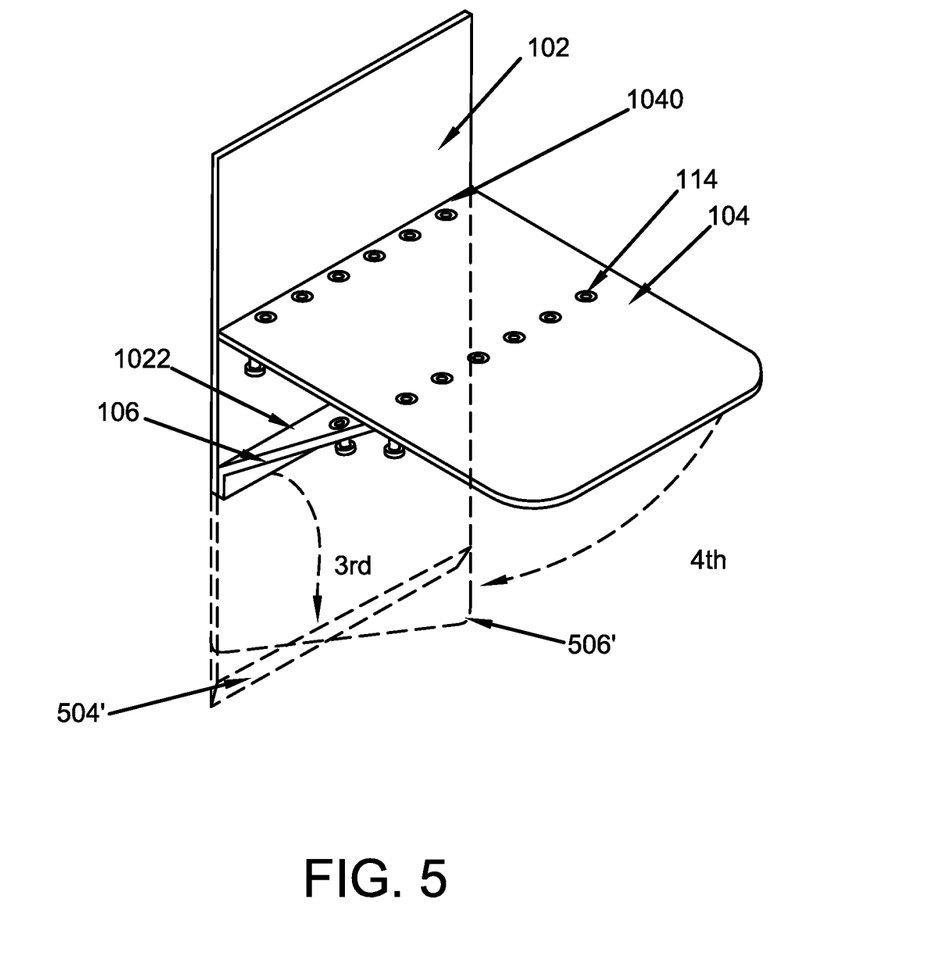
FIG. 5 illustrates a perspective view showing another method of folding the fishing seat of the present invention in accordance with the disclosed architecture.

FIG. 5 illustrates a perspective view showing another method of folding the foldable fishing seat of the present invention in accordance with the disclosed architecture. In the present embodiment, initially for folding the fishing seat, the supporting plate 106 is rotated along the direction away from the base plate 102 as shown by arrow "$3^{rd}$", and along the base arm 1022 of the baseplate 102 to be in the position 504'. Thereafter, as shown, the seating platform 104 is rotated through the direction "$4^{th}$" towards the position 504' of the supporting plate 106, thereby enabling the seating platform 104 to come into position 506'. In the final position, the seating platform 104 overlaps the supporting plate 106 to from a compact folded structure of the fishing seat 100.

Figure 6:
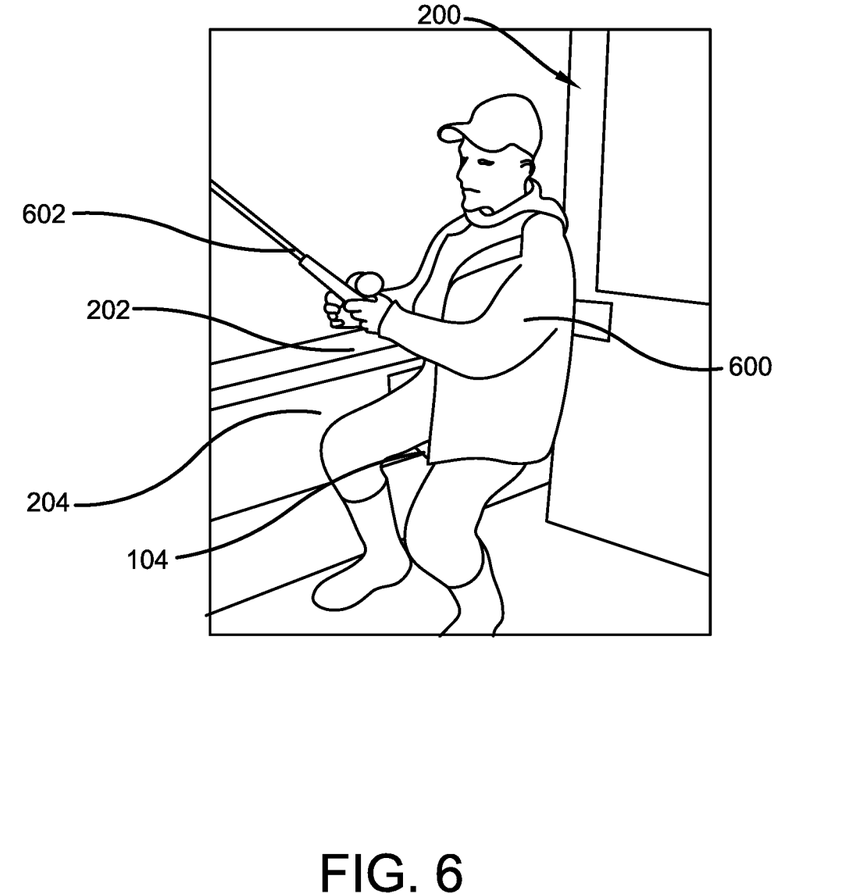
FIG. 6 illustrates a perspective view showing a user using fishing seat of the present invention for fishing in accordance with the disclosed architecture.

FIG. 6 illustrates a perspective view showing a user using fishing seat of the present invention for fishing in accordance with the disclosed architecture. As shown, a user 600 can securely and easily sit on the extendable seating platform 104 that is movably-affixed along the shelf 204, while fishing with a fishing rod 602. The user 600 can adjust the positioning of the seat as per the space availability on the boat 200, and can sit at a comfortable height and safe location below the gunwale 202 of the boat 200 that prohibits the risk of a user 600 falling overboard in rough waters. When the user 600 wants to sit on the fishing seat, the seating platform 104 is extended to position in a horizontal position that perpendicularly extends from the backplate 102 and the backplate 102 is locked into a desired position along the shelf 204. After use, the seating platform 104 can be folded to collapse next to the backplate 102, thereby conserving the space in the boat. Further, the fishing seat 100 can also be removed from the shelf 204 by removing the backplate 102 from the shelf 204.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "fishing seat", "foldable fishing seat", "seat", "improved fishing seat", and "side shelf fishing seat", are interchangeable and refer to the foldable fishing seat 100 of the present invention.

Notwithstanding the forgoing, the foldable fishing seat 100 of the present invention can be of any suitable size and configuration as is known in the art without affecting the overall concept of the invention, provided that it accomplishes the above-stated objectives. One of ordinary skill in the art will appreciate that the size, configuration and material of the foldable fishing seat 100 as shown in the FIGS. are for illustrative purposes only, and that many other sizes and shapes of the foldable fishing seat 100 are well within the scope of the present disclosure. Although the dimensions of the foldable fishing seat 100 are important design parameters for user convenience, the foldable fishing seat 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A side shelf fishing seat for mounting adjacent to an inwale of a boat, the side shelf fishing seat comprising:
    said side seat including a backplate, a seat platform, and a support plate;
    said backplate includes a front surface and a rear surface, wherein said rear surface aligns with the inwale of the boat when said side seat is installed in the boat;
    said seat platform includes a first hinge for hingedly connecting to said front surface of said backplate;
    said support plate includes a second hinge for hingedly connecting to a bottom surface of said seat platform;
    said side seat folded in a first stored orientation and selectively unfolded in a second deployed orientation;
    said backplate, said seat platform, and said support plate generally vertically aligned when said side seat is in said folded orientation; and
    said seat platform generally orthogonal to said backplate and said support plate generally at an angle of forty-five degrees to said seat platform when said side seat is in said deployed orientation.

2. The side shelf fishing seat of claim 1, wherein said seat platform includes a top surface accessible from three sides to enable a user to sit and face in a multitude of directions selected from the group consisting of facing towards the stern of the boat, facing towards the bow of the boat, and facing towards the amidships of the boat.

3. The side shelf fishing seat of claim 2, wherein said seat platform orthogonal to the inwale of the boat when said side seat is in said deployed orientation.

4. The side shelf fishing seat of claim 3, wherein said top surface includes a non-slip and protective surface.

5. The side shelf fishing seat of claim 3, wherein said top surface is scratch resistant and UV resistant.

6. The side shelf fishing seat of claim 4, wherein said backplate includes a height of generally from about 10 inches to about 18 inches.

7. The side shelf fishing seat of claim 6, wherein said backplate includes a width of generally from about 9 inches to about 18 inches.

8. The side shelf fishing seat of claim 7, wherein said backplate includes a thickness generally from about $1/8$ inch to about $3/8$ inches.

9. A side shelf fishing seat for mounting adjacent to an inwale of a boat, the side shelf fishing seat comprising:
    said side seat including a backplate, a seat platform, and a support plate;
    said backplate includes a front surface and a rear surface, wherein said rear surface aligns with the inwale of the boat when said side seat is installed in the boat;
    said seat platform includes a first hinge for hingedly connecting to said front surface of said backplate;
    said support plate includes a second hinge for hingedly connecting to a bottom surface of said seat platform;
    said side seat folded in a first stored orientation and selectively unfolded in a second deployed orientation;
    said backplate, said seat platform, and said support plate generally vertically aligned when said side seat is in said folded orientation;
    said seat platform generally orthogonal to said backplate and said support plate generally at an angle of forty-five degrees to said seat platform when said side seat is in said deployed orientation; and
    said seat platform includes a top surface accessible from three sides to enable a user to sit and face in a multitude of directions selected from the group consisting of facing towards the stern of the boat, facing towards the bow of the boat, and facing towards the amidships of the boat.

10. The side shelf fishing seat of claim 9, wherein said seat platform orthogonal to the inwale of the boat when said side seat is in said deployed orientation.

11. The side shelf fishing seat of claim 10, wherein said top surface includes a non-slip and protective surface.

12. The side shelf fishing seat of claim 10, wherein said top surface is scratch resistant and UV resistant.

13. The side shelf fishing seat of claim 10, wherein said backplate includes a width of generally from about 9 inches to about 18 inches.

14. The side shelf fishing seat of claim 13, wherein said backplate includes a thickness generally from about $1/8$ inch to about $3/8$ inches.

15. A side shelf fishing seat for mounting adjacent to an inwale of a boat, the side shelf fishing seat comprising:
    said side seat including a backplate, a seat platform, and a support plate;
    said backplate includes a front surface and a rear surface, wherein said rear surface aligns with the inwale of the boat when said side seat is installed in the boat;
    said seat platform includes a first hinge for hingedly connecting to said front surface of said backplate;
    said support plate includes a second hinge for hingedly connecting to a bottom surface of said seat platform;
    said side seat folded in a first stored orientation and selectively unfolded in a second deployed orientation;
    said backplate, said seat platform, and said support plate generally vertically aligned when said side seat is in said folded orientation;
    said seat platform generally orthogonal to said backplate and said support plate generally at an angle of forty-five degrees to said seat platform when said side seat is in said deployed orientation;
    said backplate includes a height and said seat platform includes a length, wherein said backplate height is generally equal to said seat platform length;
    said seat platform orthogonal to the inwale of the boat when said side seat is in said deployed orientation; and
    said seat platform includes a top surface accessible from three sides to enable a user to sit and face in a multitude of directions selected from the group consisting of facing towards the stern of the boat, facing towards the bow of the boat, and facing towards the amidships of the boat.

16. The side shelf fishing seat of claim 15, wherein said top surface includes a non-slip and protective surface.

17. The side shelf fishing seat of claim 16, wherein said top surface is scratch resistant and UV resistant.

18. The side shelf fishing seat of claim 15, wherein said seating platform length is from about 12 inches to about 20 inches to support a seated user.

19. The side shelf fishing seat of claim 18, wherein said backplate includes a width of generally from about 9 inches to about 18 inches.

20. The side shelf fishing seat of claim 19, said first hinge hingedly connecting said seating platform at a height from about 4 inches to about 10 inches from a bottom edge of said backplate.

* * * * *